US008784219B2

(12) United States Patent
Exner et al.

(10) Patent No.: US 8,784,219 B2
(45) Date of Patent: Jul. 22, 2014

(54) FLEXIBLE HOMOKINETIC COUPLING

(75) Inventors: Jochen Exner, Hennef (DE); Daniel Exner, Hennef (DE)

(73) Assignee: Centa-Antriebe Kirschey GmbH, Haan (DE)

( * ) Notice: Subject to any disclaimer, the term of this patent is extended or adjusted under 35 U.S.C. 154(b) by 0 days.

(21) Appl. No.: 13/556,244

(22) Filed: Jul. 24, 2012

(65) Prior Publication Data

US 2013/0040742 A1  Feb. 14, 2013

(30) Foreign Application Priority Data

Aug. 8, 2011  (EP) .................................... 11006492

(51) Int. Cl.
*F16D 3/28* (2006.01)

(52) U.S. Cl.
USPC .............. 464/71; 464/138; 464/152; 464/904

(58) Field of Classification Search
USPC ........ 464/137–140, 147, 904, 69, 71, 72, 152
See application file for complete search history.

(56) References Cited

U.S. PATENT DOCUMENTS

| 2,292,675 | A | * | 8/1942 | Thiry | ........................ 464/138 X |
| 2,380,672 | A | * | 7/1945 | Opitz | |
| 4,033,144 | A | * | 7/1977 | Allen | ......................... 464/147 X |
| 4,460,345 | A | * | 7/1984 | Chivari | ..................... 464/147 X |

FOREIGN PATENT DOCUMENTS

| DE | 726 486 | * | 10/1942 | .................... 464/147 |
| DE | 4205666 A | | 9/1993 | |
| RU | 2003868 C1 | * | 11/1993 | .................... 464/147 |

* cited by examiner

*Primary Examiner* — Gregory Binda
(74) *Attorney, Agent, or Firm* — Andrew Wilford (57) ABSTRACT

A coupling for connecting a drive to a load has an input connector that defines with a plurality of radially spaced input attachment points all lying on a common radial plane of a rotation axis and a similar output connector with a plurality of output attachment points. Connecting elements each have one end connected to a respective input attachment point and an opposite end connected to a respective output attachment point by a link joint. The radial spacing of the input attachment points from the input rotation axis and the radial spacing of the output attachment points from the output rotation axis are the same. The input attachment points and the output attachment points coupled to these input attachment points by a connecting element are angularly spaced relative to each other about the input rotation axis by 80° to 100°.

13 Claims, 14 Drawing Sheets

FLEXIBLE HOMOKINETIC COUPLING

FIELD OF THE INVENTION

The invention relates to a coupling for connecting a drive to a load, comprising an input connector such as a flange that defines an input rotation axis and is provided with a plurality of input attachment points that all lie on a common radial plane of the rotation axis and on a common radius about the rotation axis of the input connector;

an output connector such as a flange that defines an output rotation axis and is provided with a plurality of output attachment points that all lie on a common radial plane of the rotation axis and that are radially equispaced from the rotation axis of the output connector; and connecting elements, such as links or coupling rods, that each have one end connected to a respective input attachment point and an opposite end connected to a respective output attachment point, each by a link joint, in particular, a ball joint.

BACKGROUND OF THE INVENTION

A coupling of this general type has been disclosed, for example, in DE 42 05 666. This relates to a so-called articulated lever coupling in which levers pivoted between the drive and load are able to a certain extent to compensate for angular and axial misalignment of the connected elements. A shaft coupling created in this way also allows the radial misalignment of units to be compensated for whenever two couplings of the type described in DE 42 05 666 C2 are connected in series.

The links are supported in rubber bushings that have a damping function to a limited degree. In addition, rubber elements are required to provide angular positioning of drive and load relative to each other. They compensate for the change in spacing between the attachment elements of a link during rotation of the coupling.

Physical limits are placed on the possible angular and axial misalignment of two elements due to the requisite use of spacing-compensating rubber elements. In addition, the elastomer material also limits the maximum torque transmitted. In order to increase the torque load of the coupling, the coupling itself must be physically enlarged and the number of links used must be increased, which action in contrary fashion decreases the angular compensation capability of the coupling.

In order to be able to continue to bridge a defined radial misalignment between two elements given a reduced angular compensation capability, the shaft coupling must be physically lengthened.

OBJECT OF THE INVENTION

In light of the above, a significant need exists for a coupling that is capable of compensating for even relatively large angular and axial misalignments, yet at the same is able to transmit very high torques from drive to load. The object of the invention is to create a such a coupling.

SUMMARY OF THE INVENTION

The object is achieved by a coupling that has a coupling according to the invention where the radial spacing of the input attachment points from the input rotation axis and the radial spacing of the output attachment points from the output rotation axis are the same, that the input attachment points and the respective output attachment points coupled thereto by the respective connecting element are angularly spaced relative to each other about the input rotation axis by 80° to 100°, in particular, 85° to 95°, in particular, by about 90°.

In the coupling according to the invention, the connecting elements, in particular, the links, are each connected by link joints to the respective input and output attachment points. This link joint can be, for example, a ball joint. However, it is also possible to employ other suitable link joints as long as they insure that the link at its attachment end can execute a motion relative to the given attachment points through multiple, at least two, preferably, three degrees of freedom. Expressed differently, the attachment end of a link has two, preferably, three degrees of freedom relative to the attachment points.

The link joints as defined by the invention ensure that each input attachment point can execute motion with three degrees of freedom relative to the respective output attachment point connected to the same link. Expressed differently, the output attachment points preferably have three degrees of freedom relative to the associated input attachment points, i.e. the attachment points associated with the same link.

An embodiment is especially preferred where three connecting elements are provided that each interconnect an respective input attachment point with a respective output attachment point and that lie on a common radial plane extending axially of the input rotation axis between the input connector and the output connector, and form a three-part connection assembly.

The essential advantage of the coupling according to the invention is that it provides a constant-velocity joint in which the connecting elements, also called links, can be fixed on the drive and load without the use of length-compensating elastomers. This is due to the fact that the attachment elements of input unit and output unit do not change their spacing from each other during rotation of the coupling. As a result, high-strength materials such as steel or textile composite materials can be used that enable many times more torque to be transmitted than the prior art discussed above due to the significantly higher load-bearing capacity of these materials within the total system of the coupling.

An embodiment can be conceived in which the coupling has additional three-part connection assemblies between each input connector and the respective output connector, which three-part connection assemblies advantageously each comprise three connecting elements, and each lie in a respective space between the input connector and the output connector.

Providing additional three-part connection assemblies acting as force-transmitting elements between drive and load enable the working capacity of the coupling to be increased.

It is basically advantageous if the attachment points linked by one three-part connection assembly form attachment point groups that are radially equispaced yet are angularly offset relative to each other, and/or the attachment points are disposed on different radii.

Mounting the attachment elements of the drive and the load so as to be angularly spaced relative to each other by 90° produces a coupling with three connecting elements as the simplest and kinematically optimal embodiment of the invention. Additional pairs of attachment elements can be provided on the input and output side so as to increase the power density of the coupling—as long as these too have an angular spacing of 90° relative to each other. It is conceivable for these additional pairs of attachment elements to be mounted on a different radius or angularly offset relative to the first pairs of attachment elements.

It is conceivable for this spherical link joint, in particular, link providing three degrees of freedom to be produced using steel, plastic, elastomers, and/or textile materials.

These materials allow for a high load-bearing capacity in the form of a link joint between attachment points and connecting elements. However, in specific applications eliminating elastomer connections between the connecting elements and the drive as well as load has the advantage that the link joint can be free of reaction forces.

Depending on the design of the connecting elements, it is advantageous for the connecting elements to be secured against twisting about their longitudinal axis when the coupling is operating. This type of twisting about the longitudinal axis of the connecting elements can be caused, for example, by centrifugal forces.

A shaft coupling having couplings according to the invention in a double-cardan-type configuration is able to compensate for significant axial misalignment of the unit due to its construction. This capability is provided essentially by the spherical articulation of the connecting elements, the spacing of their planes, and the spacing of the attachment points relative to each other.

When using two couplings that are joined by a shaft to a shaft coupling of double-cardanic construction, the useful approach is to impede the axial freedom of motion so as to control the axial play of the shaft located between the couplings.

Both the axial play as well as the twisting of the connecting elements about their longitudinal axis can be attenuated and/or prevented, for example, by the intelligent use of elastomers without having to fear negative effects on smooth function, angular compensation capability, and axial compensation capability.

It is theoretically possible to compensate for an angular misalignment of to 90°, and to transmit torques of well over 500,000 Nm. In a realistic scenario, it is easily possible to compensate for an angular misalignment of 10° to 45°, something that was virtually impossible to achieve to now by conventional couplings.

BRIEF DESCRIPTION OF THE DRAWING

The following describes the invention in more detail based on an illustrated embodiment. The description also discloses additional advantages. Therein.

SPECIFIC DESCRIPTION OF THE INVENTION

Figure 4:
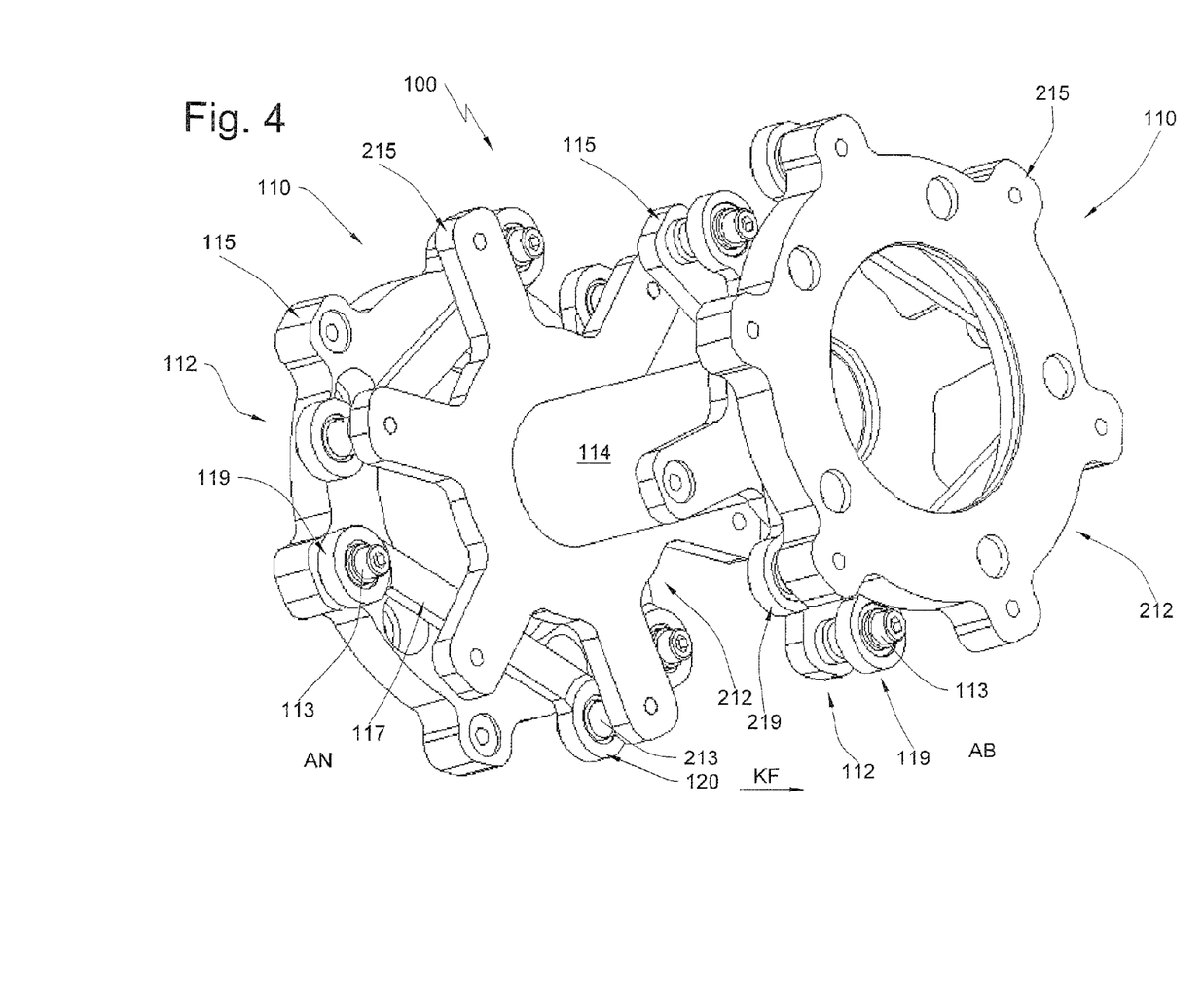
FIG. 4 is an isometric view of a shaft coupling using two couplings according to the invention as shown in FIG. 1.
Figure 5:
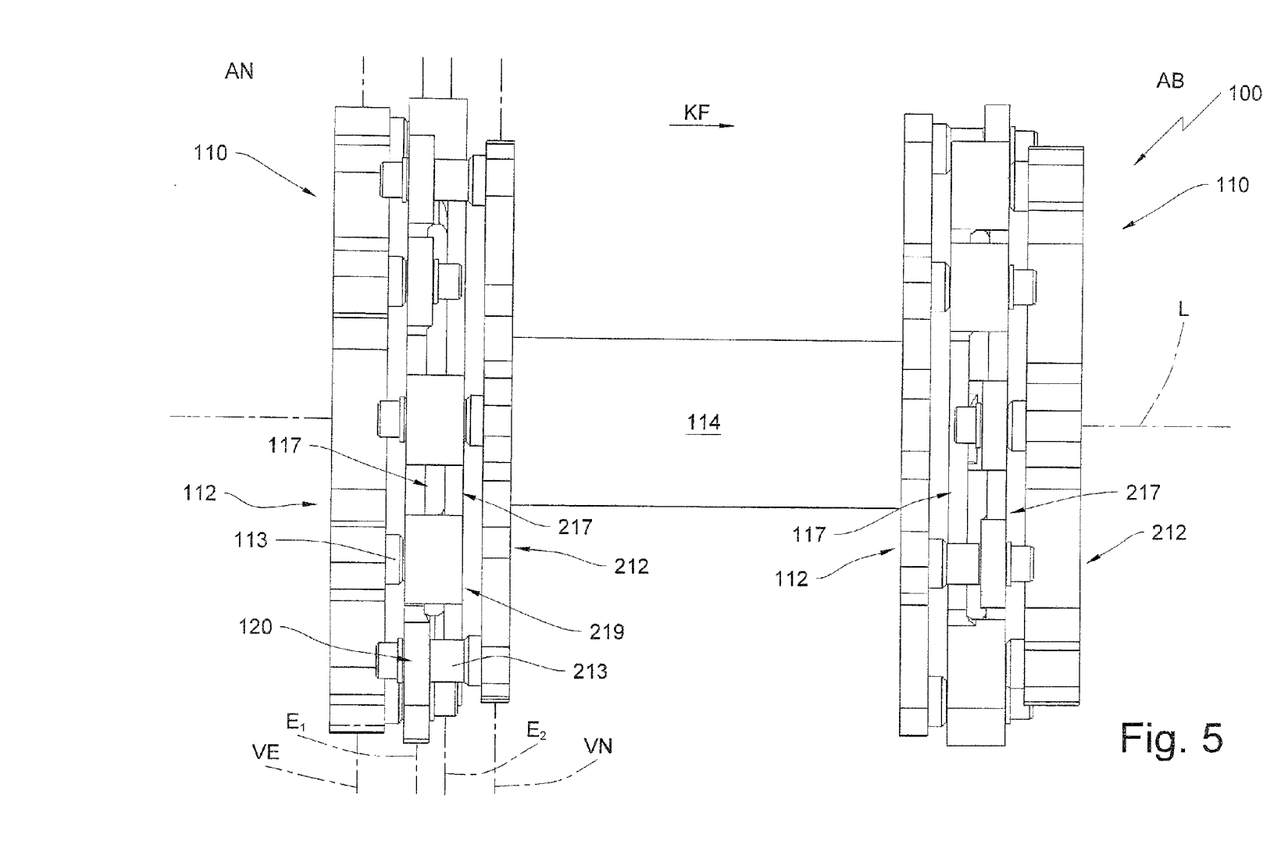
FIG. 5 is a side view of the shaft coupling of FIG. 4

A complete shaft coupling is identified by reference numeral 100 in FIGS. 4 and 5.

A shaft coupling 100 has two complete couplings each identified by reference numeral 110. The couplings 110 are spaced axially in a direction KF of power flow and are coupled to each other by a shaft 114. The power flow runs from an unillustrated drive AN to an also unillustrated load AB. A component described below as being on the input side is generally mounted on an additional component on the input side; while a component identified below as being on the output side is generally mounted on another component on the output side.

Figure 1:
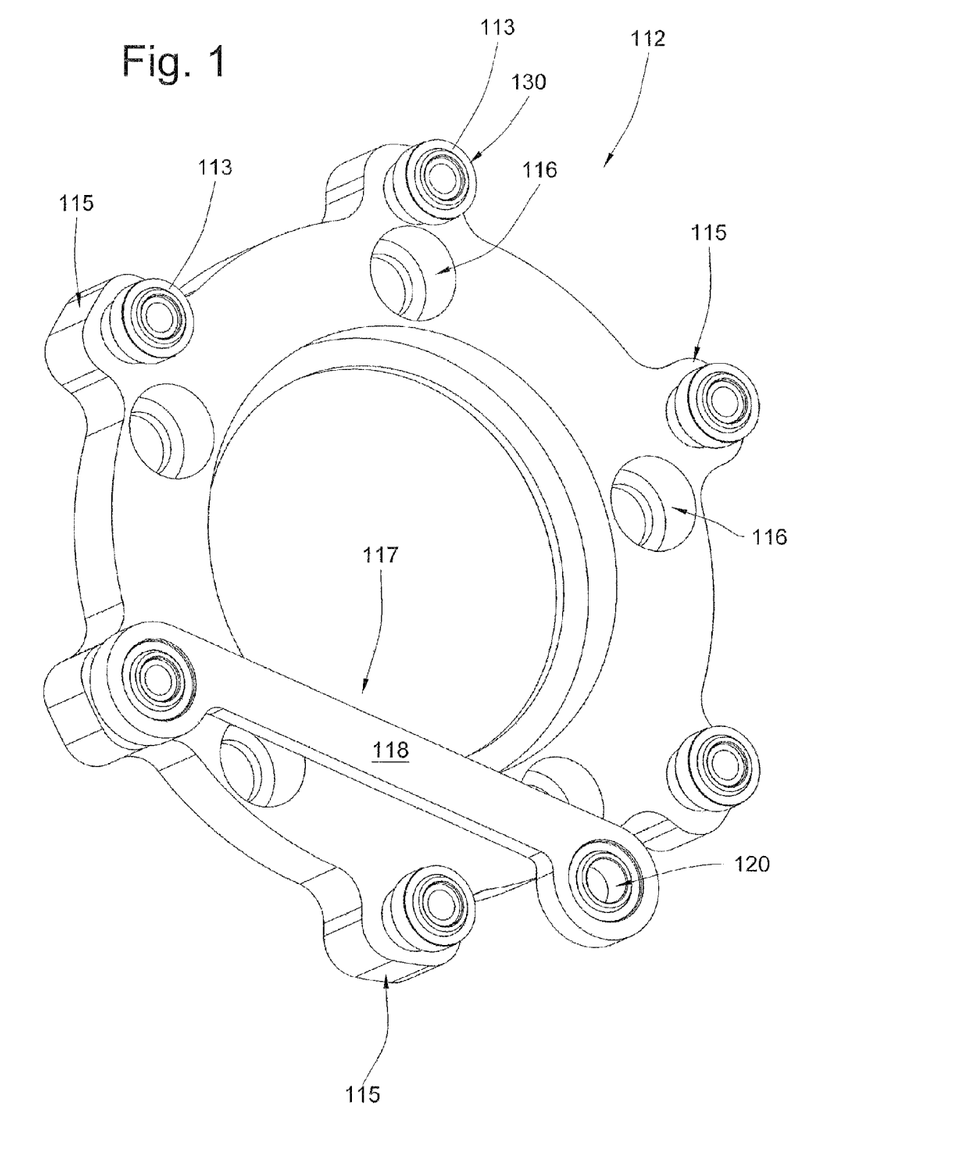
FIG. 1 shows a first embodiment of an input connector of a coupling according to the invention that has one connecting element.

FIG. 1 shows an input connector 112 that is also identified as the input flange 112 or the input flange ring 112. The flange 112 is of annular shape and is provided with stellate projections 115 that project radially outward. These projections 115 can be distributed angularly uniformly around the circumference and hold respective input attachment points 113. The ring itself is provided with blind bores 116 from which unillustrated threaded bolts extend for attachment to an input unit.

Also shown in FIG. 1 is a connector given reference numeral 117 and also identified below as the link 117 or the coupling rod 117. This link 117 has a roughly bar-shaped connector piece 118 having on one end an input eye 119 and on the other end an output eye 120. Input attachment points 113 are inserted into the illustrated input eyes 119, while the output eyes 120 receive output attachment points 213.

FIG. 2 again shows the connector 112 described above. The drawing also shows two more links 117 whose input eyes 119 are connected to respective input attachment points 113. Here too, output eyes 120 are provided to connect to respective output attachment points 213.

Figure 2:
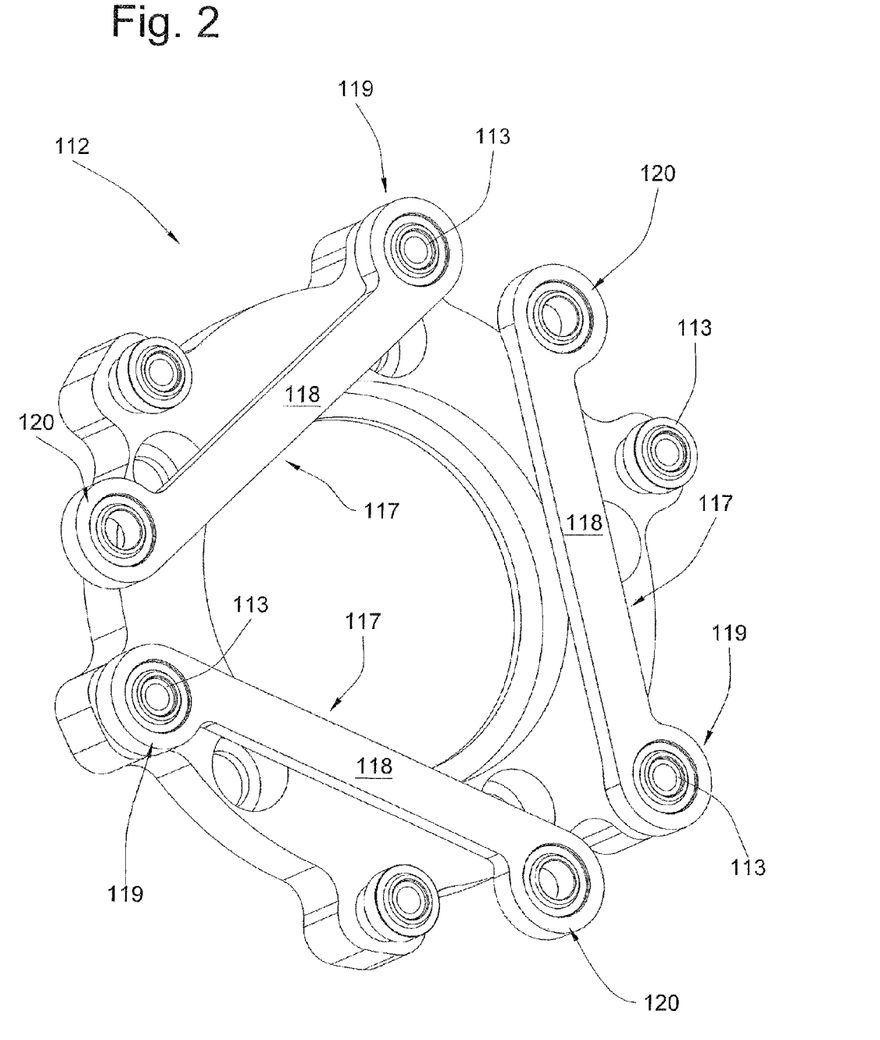
FIG. 2 shows the connector of FIG. 1 with three connecting elements.

As FIG. 2 reveals, every other input attachment point 113 in this embodiment is connected to a respective one of the input links 117 by its input eye 119. However, this configuration is specific to the embodiment described.

Figure 3:
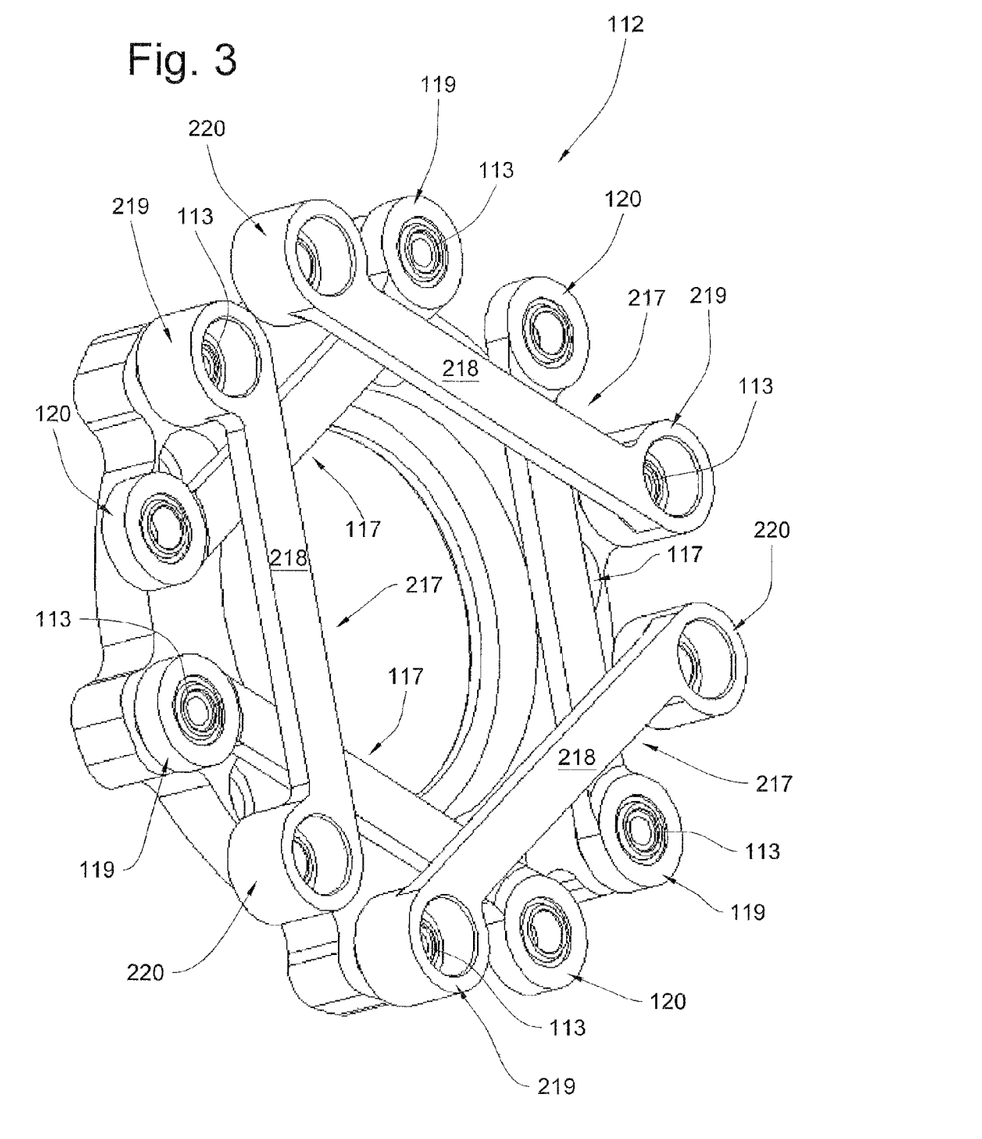
FIG. 3 shows the connector of FIG. 1 with six connecting elements.

FIG. 3 also shows the attachment flange 112 of FIGS. 1 and 2. In addition to the three input links 117 shown in FIG. 2, here three additional output links 217 are shown.

The output links 217, also called output connectors 217 or output coupling rods 217, also each include a connector piece identified by reference 218. Each output connector piece 218 has an input eye 219 at one end that is connected to a respective input attachment point 113. At the other end, each output connector piece 218 has a respective output eye 220 in FIG. 3 for output attachment points that are not specifically identified.

Clearly shown in the drawing of the output links 217 is the fact that both the input eyes 219 and also the output eyes 220 project out of the plane of the connector pieces 218, both eyes 219 and 220 projecting out of this plane of the connector pieces 218 in the same direction. In contrast, the eyes 119 and 120 of the input links lie in the plane of the connector pieces 117. This design enables the input links 117 to lie in a first radial plane of the coupling 110, and the output links 217— here, in particular, the connector pieces 218—to lie in a second radial plane of the coupling 110. As a result, the input links 117 do not collide with the output links 217 when the coupling 110 rotates.

For clarity of view, the output connector 212, which again can be identified as the output flange 212 or the output flange ring 212, is not shown in FIGS. 1 through 3. However, based on the structure shown in FIGS. 1 through 3 it is easy to imagine how this output connector lies in a different plane that is located beyond the link 217 as shown in FIG. 3. In this embodiment, this output connector, not shown in FIG. 3, is provided complementarily to the input connector 112 and thus also has stellate projections that support output attachment points 213.

FIG. 4 is an isometric view of a shaft coupling that is identified in its entirety at 100. This has two of the couplings 110 that are connected in series in the direction KF of power flow and are coupled together by a shaft 114. The direction of power flow runs from drive AN, which is not shown but is on the left side, to load AB, which is on the right side, also not shown. Shaft couplings of this type are preferably employed to compensate for radial misalignment between the drive AN and the load AB.

For the sake of clarity, not all links are shown in FIG. 4. The input connectors 112 are also not of the same construction as the output connectors 212. This does not have any effect, however, on the above-described functionality.

FIG. 5 is a side view of shaft coupling 100 illustrating all of its parts.

The shaft coupling 100 has a longitudinal center axis L that in this drawing is coaxial to the rotation axis of the shaft coupling 100. In addition, the longitudinal central axes of the couplings 110, and the rotational axes of the input and output connectors 112 and 212 are also coaxial. However, this situation is only found in the case of an ideal alignment the unillustrated drive AN and the unillustrated load AB as indicated in FIG. 5. The radial planes are defined by radii that originate in the rotation axis of the input connector 112.

FIG. 5, in particular, shows the individual radial planes of couplings 110 that follow each other in the direction KF of power flow. Each input connector 112 thus lies in an upstream plane VE. This is followed by the first plane $E_1$ in which the input links 117 lie. The output links 217 lie in a second plane $E_2$, followed by a downstream plane VN with the output connector. The planes $E_1$ and $E_2$ axially delimit a space within each of which three links 117 or 217 lie forming a three-part connection assembly.

Figure 12:
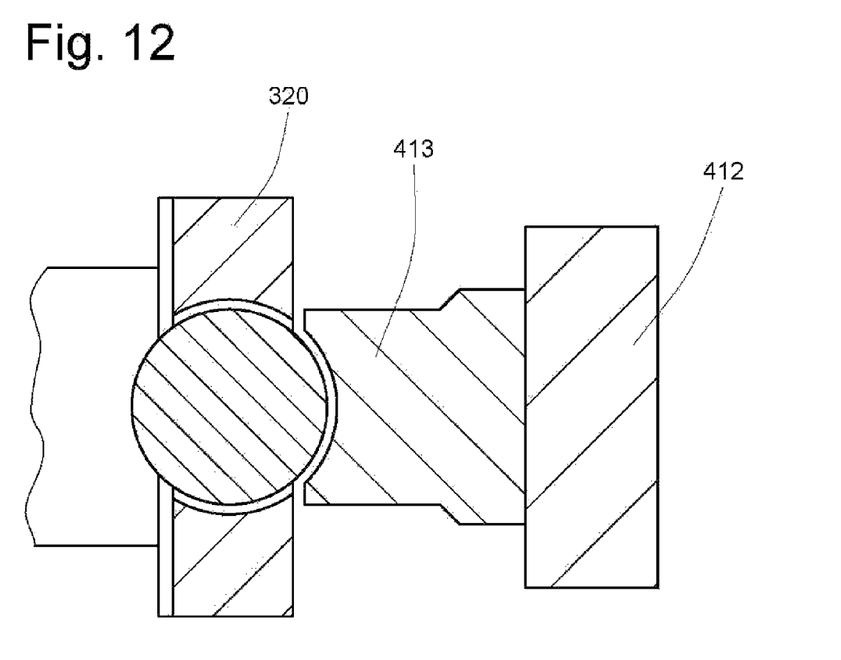
FIG. 12 shows the ball joint of this invention.

Attachment points 113 and 213 are preferably of spherical design and together with the eyes 119, 120, 219, 220 form a ball joint 130 (See FIG. 12), thereby enabling the respective input connector 112 to extend at an angle relative to the output connector 212. The ball-joint linkage also allows for axial misalignment of the input connector 112 and the output connector 212. In terms of the diagram in FIG. 5, the spacing between the connectors 112 and 212 can consequently be expanded. As a result, the angular misalignment and axial misalignment between the drive AN and the load AB is compensated for.

Interconnecting the two couplings 110 according to the invention to form the shaft coupling 100 as shown in FIG. 5 allows radial misalignment to be compensated for between two elements due to the fact that the first coupling 110 in the direction KF of power flow is at a specific angle greater than 0° between connectors 112 and 212, while the output coupling 110 between its connectors 112 and 212 is of a corresponding opposite angle. The selected arrangement of attachment points 113 and 213 relative to the rotation axis of the respective connectors 112 and 212 in combination with the 90° angular spacing between the two attachment points 113 and 213 of the link 117 or 217 enables the links to be linked to the respective attachment points 113 and 213 without rubber supports.

The angular spacing of 90° between attachment points 113 and 213 corresponds to a kinematically ideally designed coupling 110. Depending on the size of the coupling 110 and the tolerances of the components, in particular, of the total cumulative bearing play, the angular spacing can deviate from the ideal as long as any changes in spacing then occurring between the attachment points 113 and 213 are taken up by the tolerances or material elasticities.

Based on this arrangement, an angular misalignment between the drive AN and the load AB can be compensated for without having the spacing between the attachment points 113 and 213 of link 117 or 217 undergo any change. Consequently, no flexible element is required to compensate for this change in spacing. As a result, the angular compensation capability of a coupling element according to the invention is dependent only on the fact that the links 117 and 217 as well as the attachment points 113 and 213 ensure sufficient angular freedom of motion, which fact is determined by the spacings of the planes VE, $E_1$, $E_2$, and VN.

This means that in theory angles of almost 90° could be bridged. Under real conditions, it is easily possible to compensate for angles of 10° to 45°, and this constitutes a significant improvement over the previous angular compensation capability of a maximum of 2° found in couplings of this type. A greater angular compensation capability of the coupling 110 according to the invention is also conceivable—even if it would have to be assumed in reality that such a unit is required only in a few special cases.

Figure 13A:
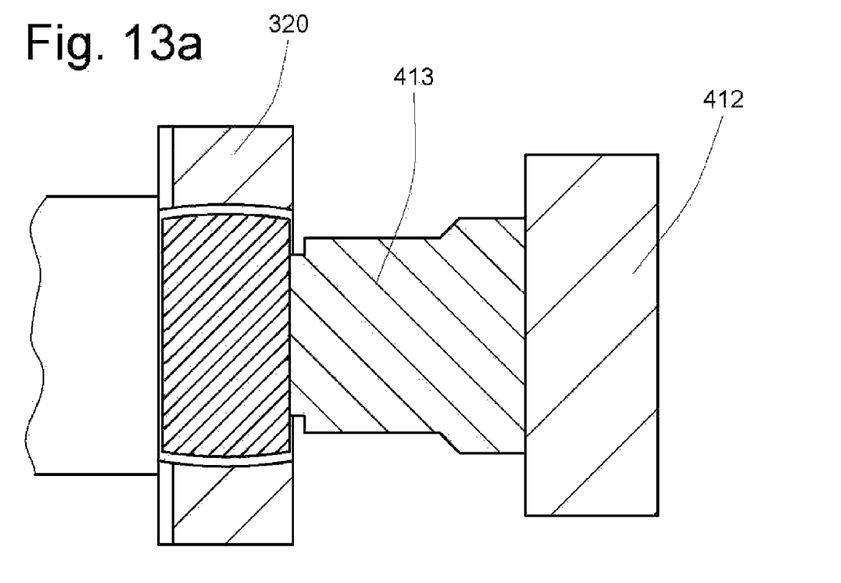
FIGS. 13a, 13b, 13c, and 13d are views like FIG. 12 of ball joints made of steel, plastic, an elastomer, and a textile, respectively.
Figure 13B:
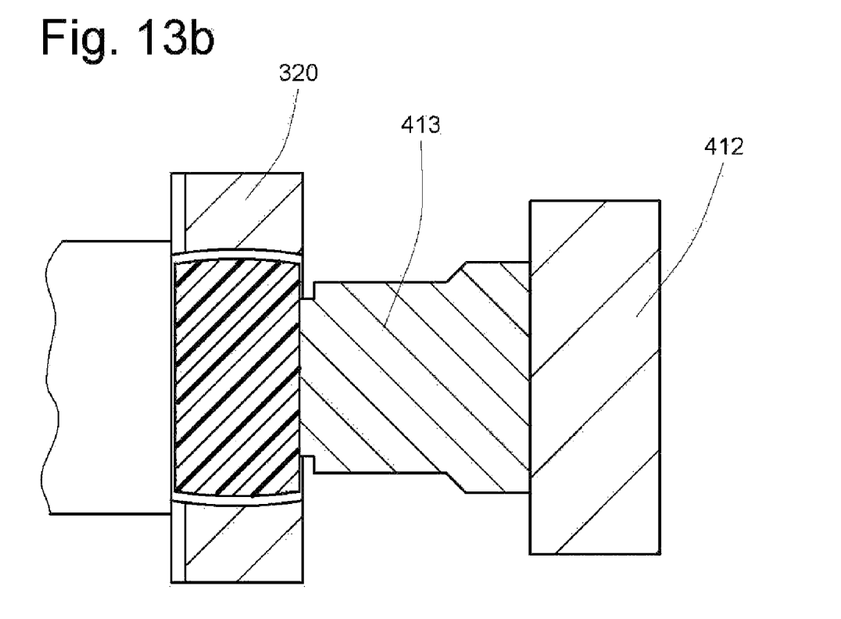
Figure 13C:
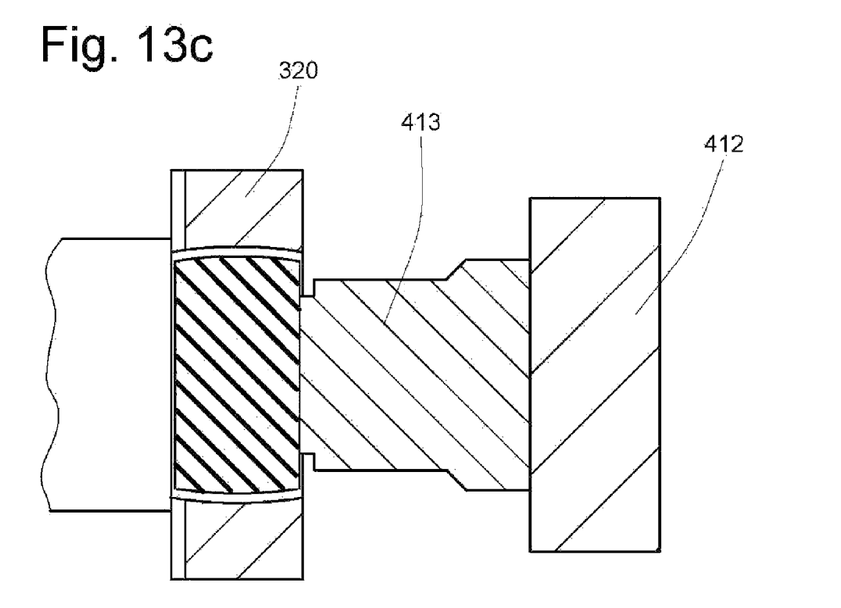
Figure 13D:
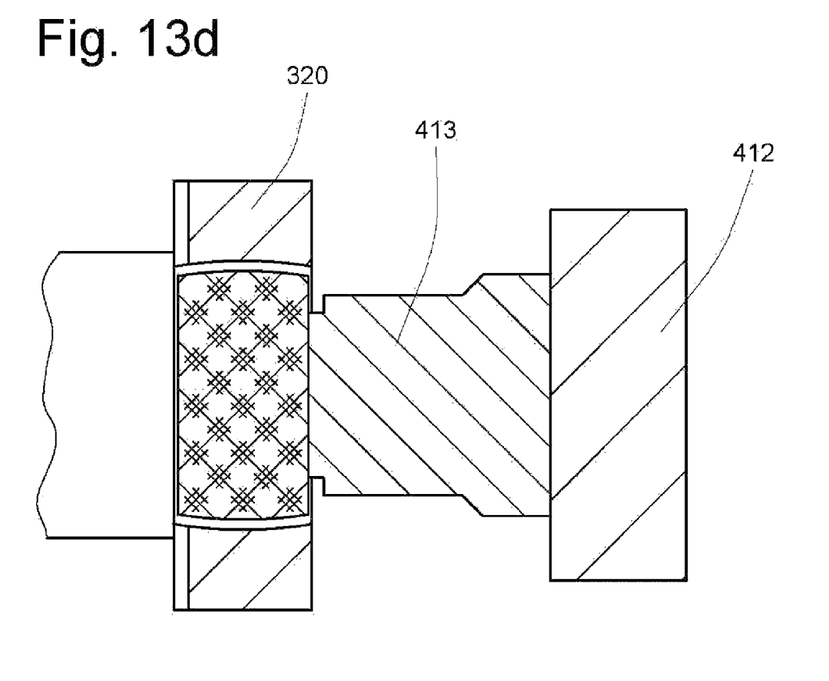

Eliminating elastic elements to link the connector points 113 and 213 to the links 117 and 217 furthermore enables very much higher torques to be transmitted from the drive AN to the load AB with the angular compensation capability unrestricted. The above-mentioned ball joints can thus be composed, for example, of steel balls, and similarly steel eyes 119, 219, 120 and 220. Alternatively, high-performance textile composite materials, as well as pivot bearings composed of high-performance steel (FIG. 13a), plastics (FIG. 13b), an elastomer (FIG. 13c), or a textile (FIG. 13d) are also conceivable for producing the ball joints.

Any twisting of the links 117 and 217 about their longitudinal axes or axial play on the part of the shaft 114 of the shaft coupling 100 when operating can be significantly minimized or precluded by the use of suitable damping elements that do not impair the actual angular or axial compensation function. In order to prevent any tilting of the links 117, 217 on their longitudinal axes, suitable elastomers can be provided in the region of the link joints. These can also function to prevent uncontrolled axial movement by the shaft 114. Alternatively or additionally, elastomer buffers on the connectors 112, 212 can prevent uncontrolled axial movements by the shaft 114.

To summarize, the coupling 110 has been presented that in excellent fashion is able to compensate for angular and axial misalignment without having to compromise the transmission of torque. It is of much higher performance than couplings of the generic prior art, both in terms of transmittable torques, and in particular in terms of compensation of angular misalignment. By using additional links 117 and 217, as well as additional attachment points 113 and 213, while utilizing the features according to the invention, it is possible to further increase the torque transmission capacity without having to make compromises in terms of the angular compensation capability of the coupling 100.

Figure 11:
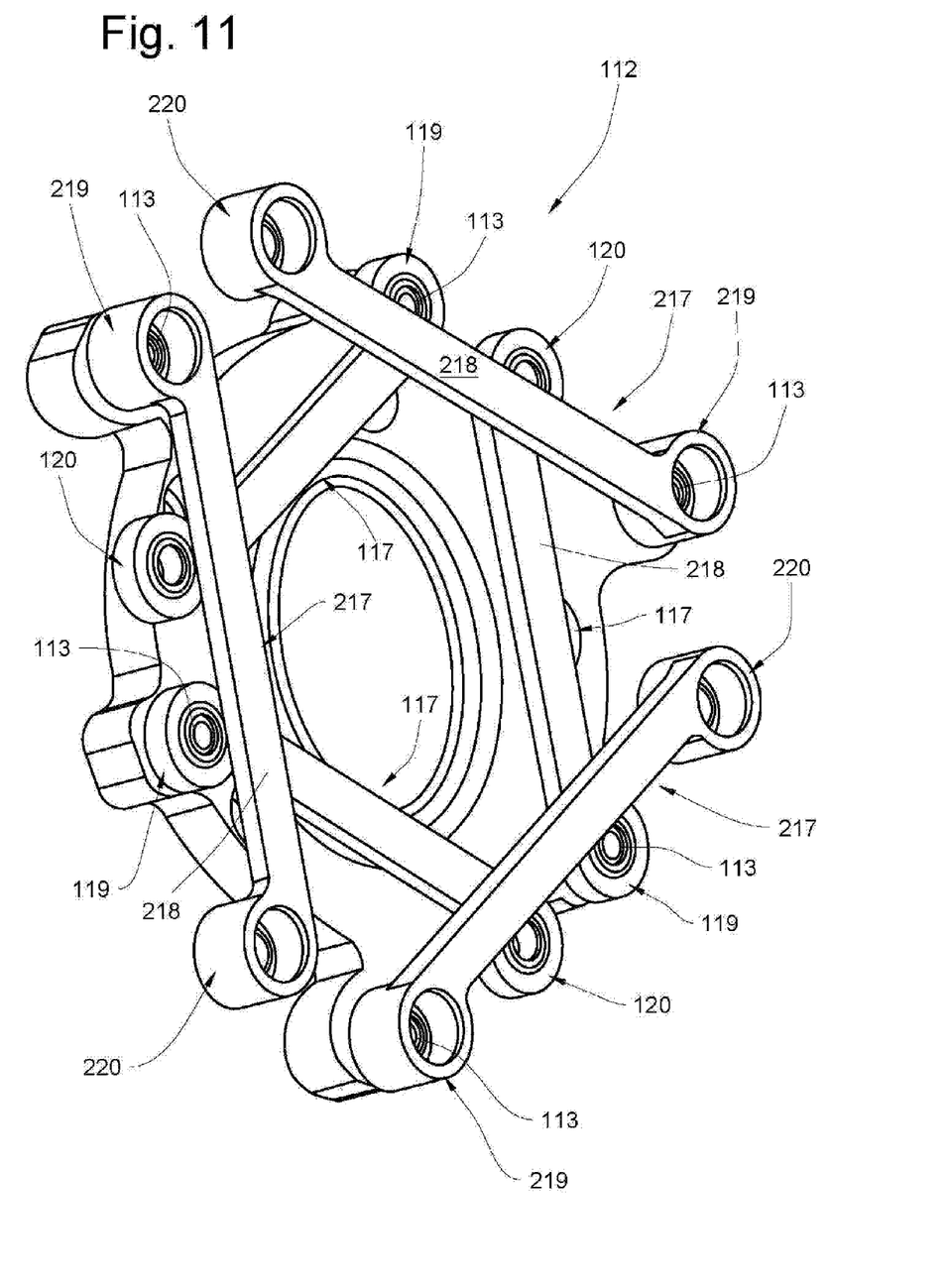
FIG. 11 is another view like FIG. 3 with six connecting elements on different radii.

FIGS. 1-5 show couplings 110 that in terms of construction of the connectors 112 and 212 are intended for three links 117 and three additional links 217 in the form of two three-part connection assemblies, each in a separate radial space. To this end, the stellate projections 115 of the first and second three-part connection assemblies, or of the input links 117 and of the output links 217, together with the respective attachment points 113 are radially equispaced of each connector 112 or 212 but angularly offset relative to each other. Whereas in FIGS. 1-9 the attachment points 113 and 213 are radially equispaced from the axis, in FIG. 11 the attachment points 113 are at different radial spacings.

The basic form of the coupling according to the invention is now presented in the following description with reference to FIGS. 6 through 10. In order to ensure the ability to differentiate between the two embodiments, different reference numerals are used even for analogous components, despite the fact that an identical or analogous function is provided.

Figure 7:
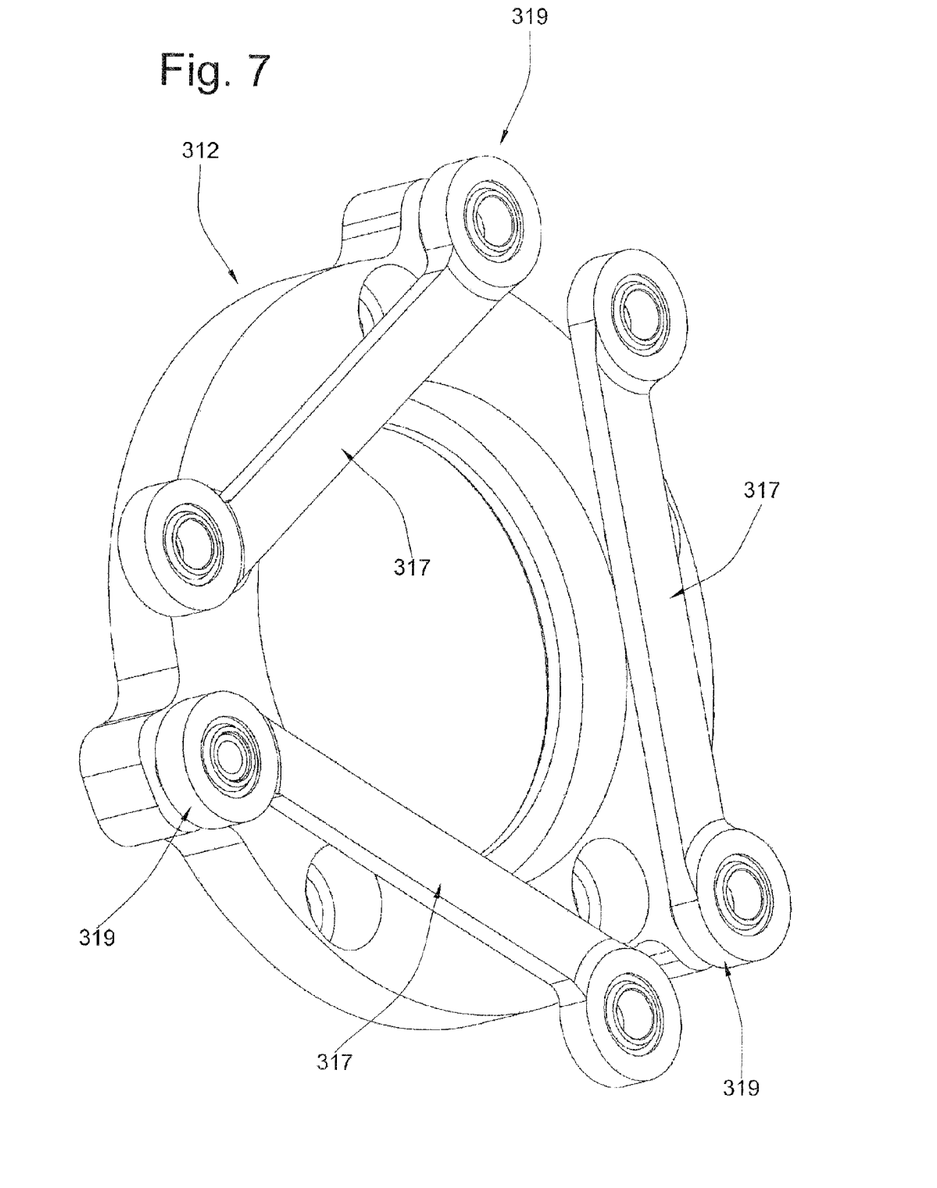
FIG. 7 is a perspective view of the connecting element of FIG. 6 with three connecting elements.
Figure 8:
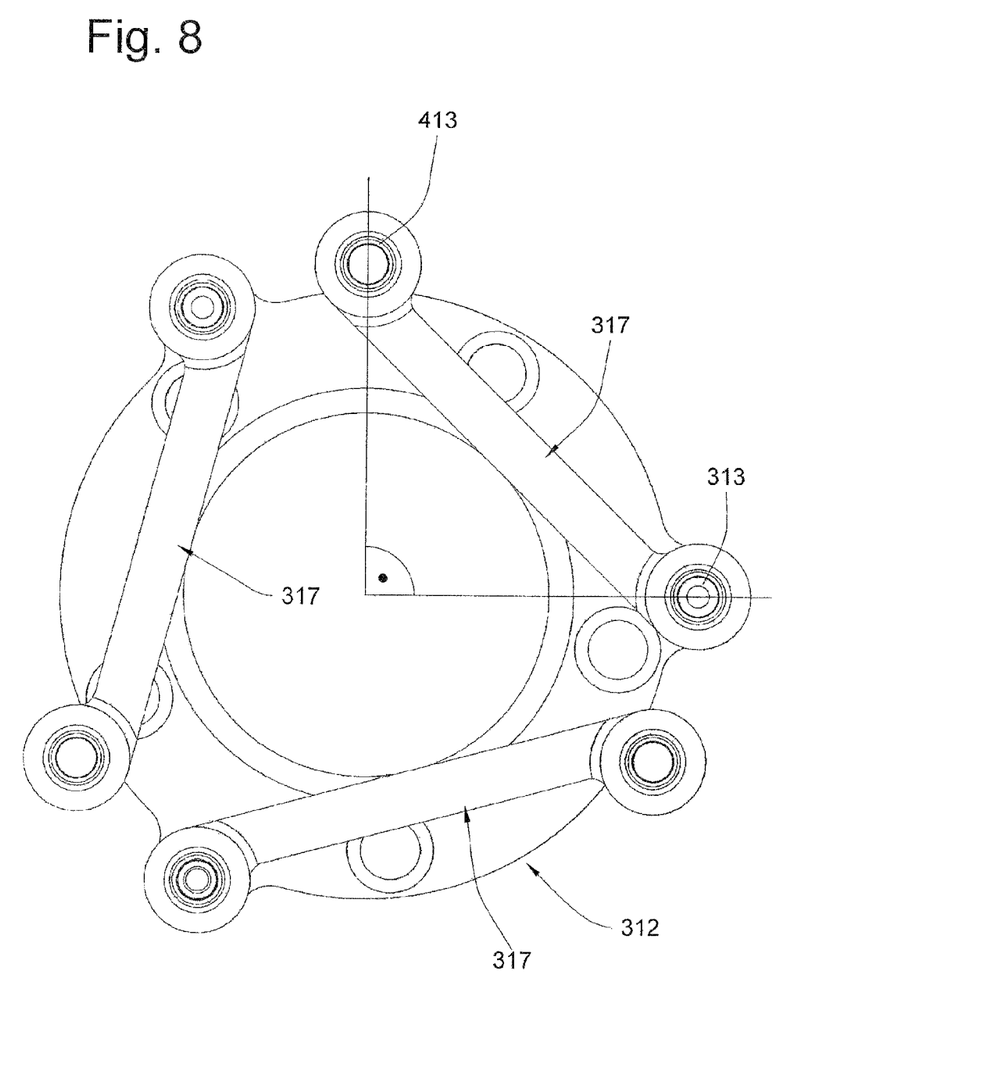
FIG. 8 is an end view of the connecting element of FIG. 7.
Figure 9:
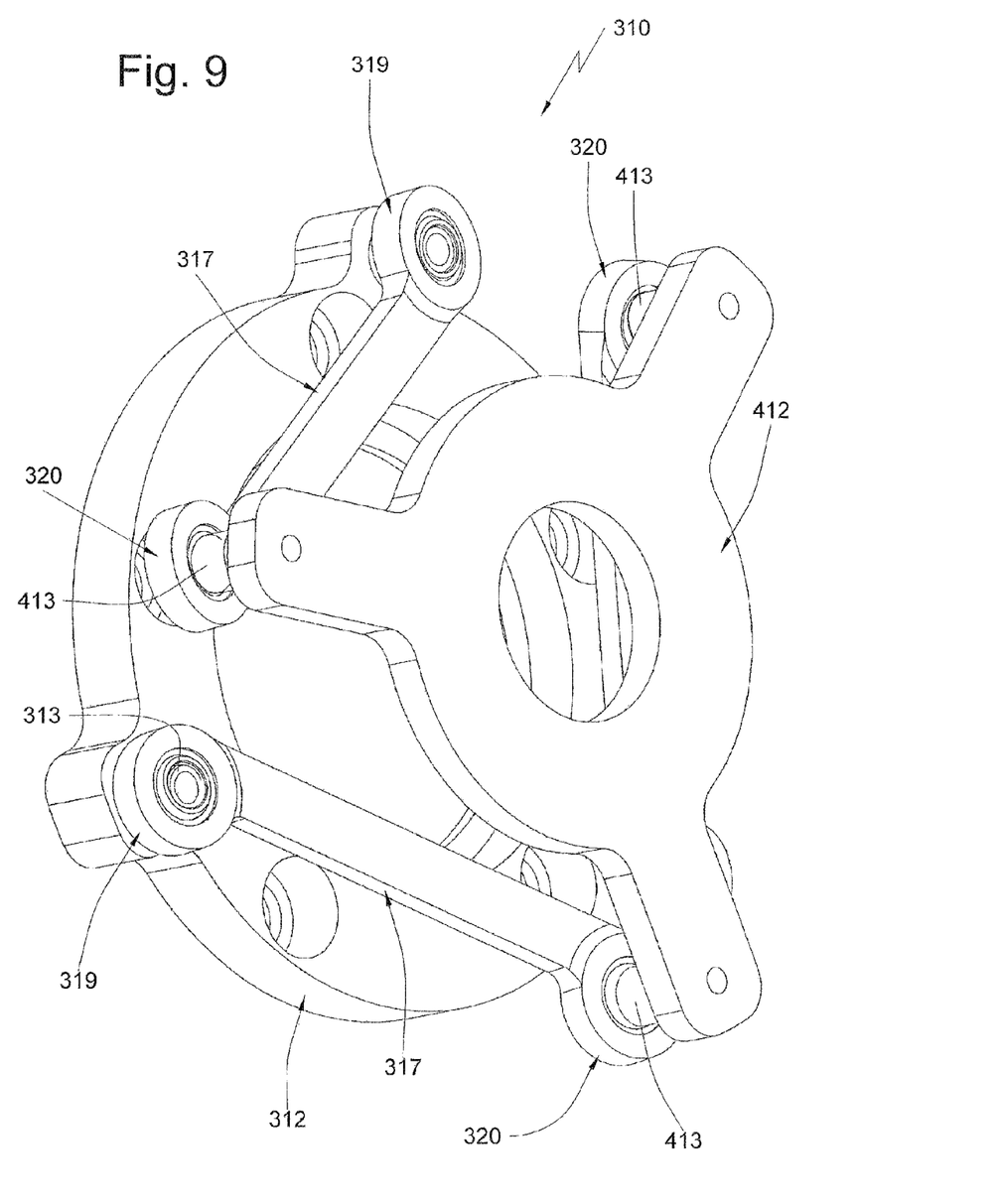
FIG. 9 is an isometric view of a second embodiment of a coupling that uses a connecting element as provided in FIGS. 6 through 8 in an isometric view.
Figure 10:
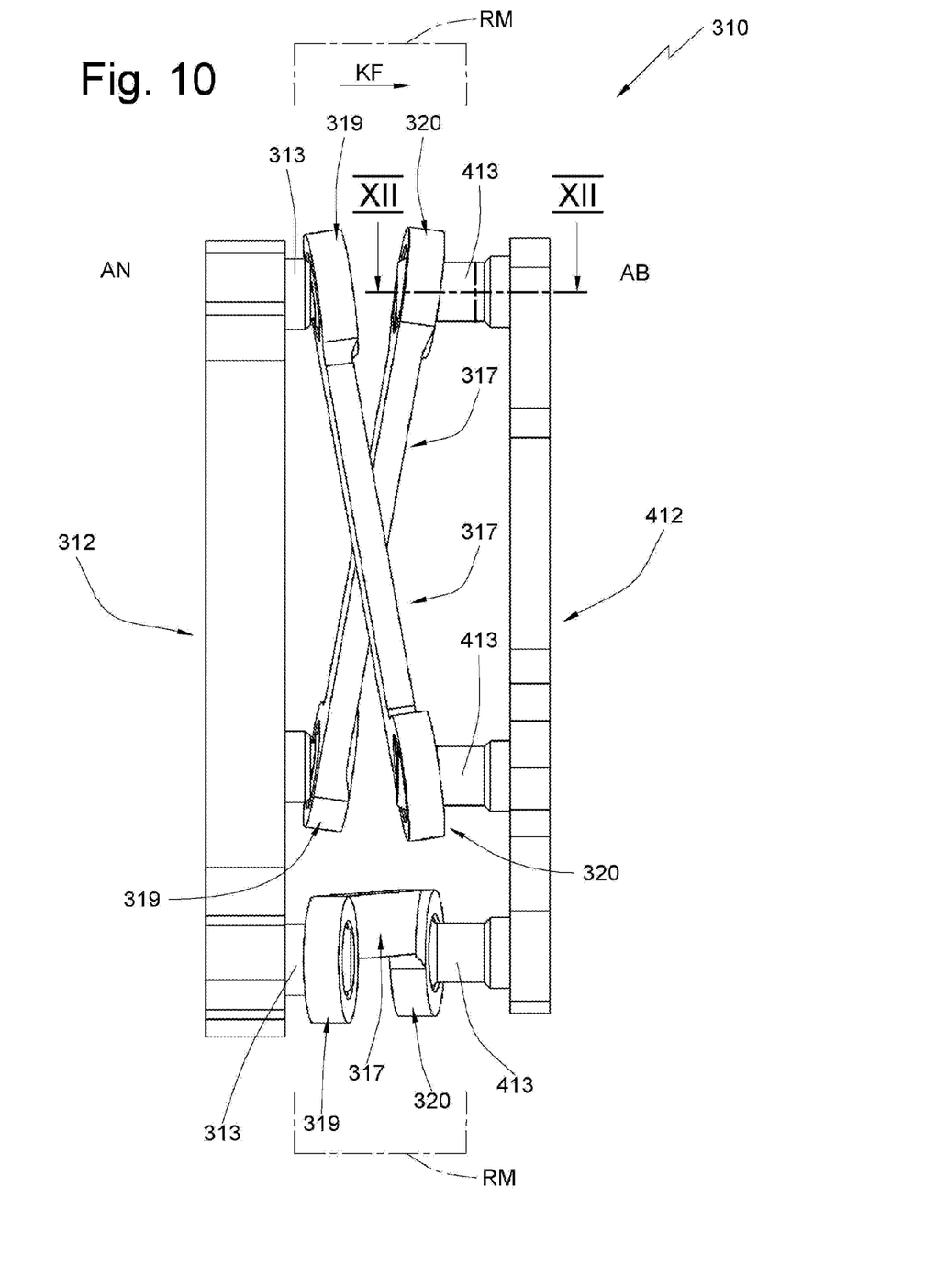
FIG. 10 is a side view of the coupling in FIG. 9.

The entire coupling of FIGS. 6 through 10 is identified in FIGS. 9 and 10, and throughout by reference numeral 310.

Figure 6:
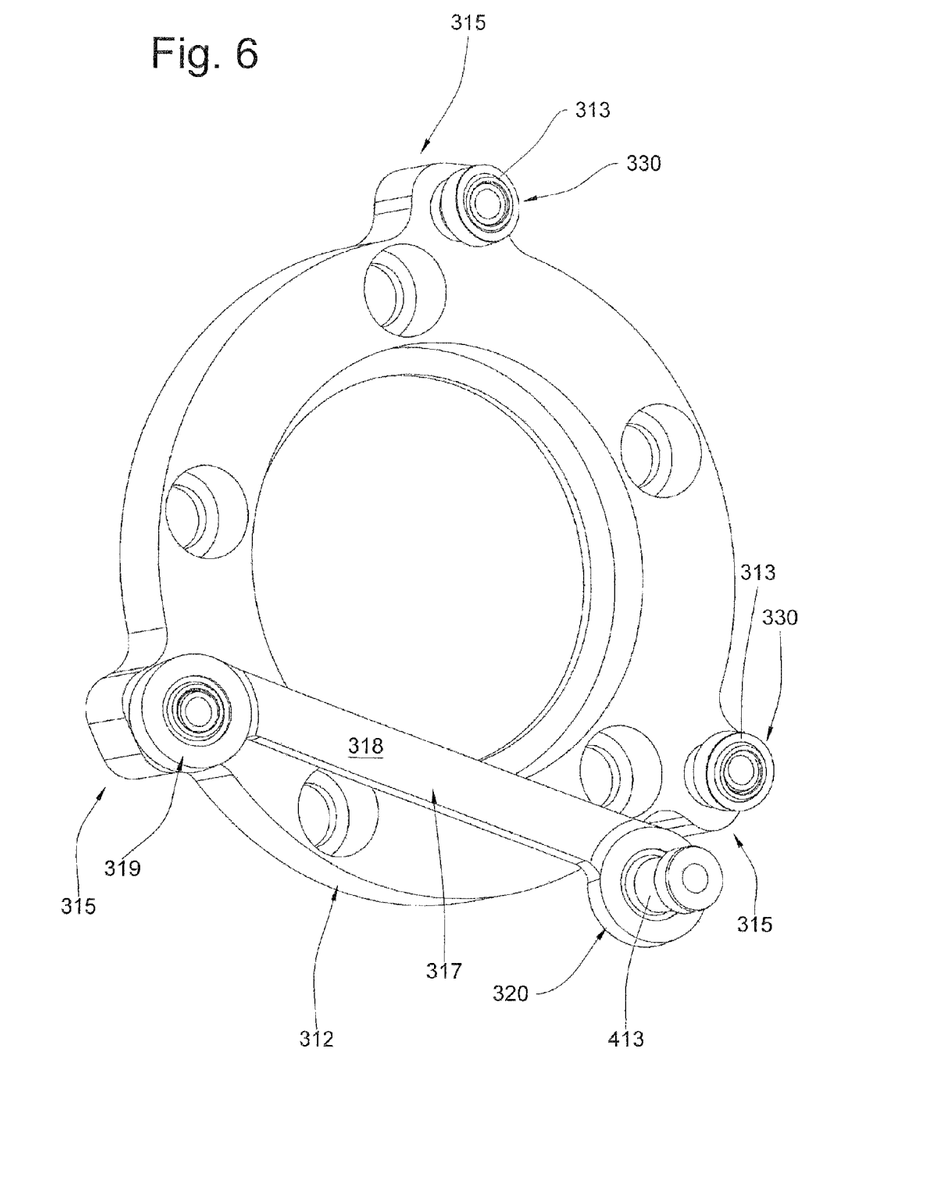
FIG. 6 shows a second embodiment an input connector of a coupling according to the invention that has a connecting element.

First, FIG. 6 shows an input connector 312 in the form of an annular flange 312, including connecting elements 317 (also called links or coupling rods). The input connector 312 has three angularly equispaced stellate projections 315 that carry respective input attachment points 313. These input attachment points 313, just as in the previously described embodiment, are ball joints carried on a stud, the ball joints being surrounded by a bushing-like ring 330. These bushing rings 330 of each input attachment points 313 are seated in respective input eyes 319 of the links 317. The same structure is used for the output attachment points 413 shown in FIG. 6, which attachment points is inserted in the link 317. The input eyes 319 and output eyes 320 are linked by connector pieces 318 of the links 317.

FIG. 7 is a perspective view like FIG. 6 of the input connector 312, which here, however, supports on each of its three attachment points 313 a respective link 317 by means of a respective input eye 319 of the link.

In this basic form of the coupling 310 as well, the input attachment points 313 and output attachment points 413 are angularly spaced relative to each other by approximately 90° about the unillustrated rotation axis of the input connector 312. It is possible to deviate from this ideal angle with material tolerances, fitting tolerances, and material elasticities without basically affecting the function of the coupling 310. Just as with the previous embodiment, the invention is based on the fact that the actual angular spacing of the input attachment points 313 and of the output attachment points 413 can vary between 80° and 100°.

In FIG. 8, the output connector 312 of FIG. 7 is shown again as viewed axially. Easily seen here are the angular spacing of 90° between the input attachment points 313 and the output attachment points 413 of each link 317. The three illustrated links 317 form a three-part connection assembly constituting a basic configuration of the connecting elements.

As already described above, the coupling 310 is provided in an overall perspective view in FIG. 9. Shown in addition as compared with FIG. 7 is an output connector 412 with its output attachment points 413 that engage the output eyes 320 of the links 317.

FIG. 10 is a side view of the coupling 310. Flow of power KF runs from the drive AN to the load AB, as also shown in the previous embodiment.

What is notable as compared with FIG. 5 is the fact that the links 317 do not extend parallel to the connectors 312 or 412, but instead form an angle with the connectors 312 or 412. This results from the compensation of an axial misalignment between the drive AN and the load AB. Consequently, the links 317 occupy a radial space RM that extends parallel to the unillustrated rotation axes of the input or output connector 312 and 412. The coupling 310 would compensate for an angular misalignment between the drive AN and the load AB if the connectors 312 and 412 were not parallel to each other but instead at an angle to each other.

It is readily evident by comparing the two embodiments that the second embodiment shown in FIGS. 6 through 10 represents the basic form of the coupling according to the invention. The unit has a single three-part connection assembly that interconnects the input connector 312 and output the connector 412 by nonpositive means.

As described in terms of the first embodiment in FIGS. 1 through 5, additional three-part connection assemblies can be disposed between each input connector 312 and one output connector 412. These then occupy a second radial space RM and enhance the performance capability, that is, the ability of coupling 310 to transmit torque. The attachment points associated with every second three-part connection assembly can, on the one hand, be disposed on the connectors with identical radii but angularly offset relative to the attachment points of the other three-part connection assembly. Alternatively, it is conceivable for them to be disposed on a different radius, which approach results in different link lengths between the three-part connection assemblies.

It is theoretically also conceivable to provide only one or two additional links instead of an additional three-part connection assembly.

The invention claimed is:

1. A coupling for connecting a drive to a load, the coupling comprising:
    an input connector that defines an input rotation axis and is provided with a plurality of input attachment points that all lie on a common radial plane of the rotation axis and that are radially equispaced from the rotation axis of the input connector;
    an output connector that defines an output rotation axis and is provided with a plurality of output attachment points that all lie on a common radial plane of the rotation axis and that are radially equispaced from the rotation axis of the output connector; and
    connecting elements that each have one end connected without length compensation and with at least two degrees of freedom to a respective input attachment point and an opposite end connected without length compensation and with at least two degrees of freedom to a respective output attachment point, each by a link joint, the radial spacing of the input attachment points from the input rotation axis and the radial spacing of the output attachment points from the output rotation axis being the same, the input attachment points and the output attachment points coupled to these input attachment points by a connecting element being angularly spaced relative to each other about the input rotation axis by 80° to 100°.

2. The coupling according to claim 1, wherein three connecting elements are provided that each connect a respective input attachment point to a respective output attachment point and that lie in a common space extending axially of the input rotation axis between the input connector and the output connector, and form a three-part connection assembly.

3. The coupling according to claim 2, further comprising additional three-part connection assemblies between the input connector and the output connector that each comprise three connecting elements and each lie in a respective space between the input connector and the output connector.

4. The coupling according to claim 3, wherein the attachment points linked by one three-part connection assemblies each form groups of attachment points that are radially equispaced, yet are angularly offset relative to each other.

5. The coupling according to claim 3, wherein the attachment points linked by one three-part connection assembly each form groups of attachment points that are on different radii.

6. The coupling according to claim 1, wherein the attachment points are connected to the connecting means by ball joints.

7. The coupling according to claim 1 wherein each ball joint is produced using steel, plastic, or textile materials.

8. The coupling according to claim 1, wherein the connecting elements are secured against twisting about their longitudinal axis when the coupling is operating.

9. A shaft coupling comprising two interconnected couplings as set forth in claim 1, wherein although the coupling has free travel compensating for the axial misalignment of drive and load, it is nevertheless secured against axial play when the coupling is operating.

10. The coupling defined in claim 1, wherein the input attachment points and the output attachment points coupled to these input attachment points by a connecting element are angularly spaced relative to each other about the input rotation axis by 85° to 95°.

11. The coupling defined in claim 1, wherein the input attachment points and the output attachment points coupled to these input attachment points by a connecting element are angularly spaced relative to each other about the input rotation axis by about 90°.

12. The coupling defined in claim 1, wherein each connecting element has a roughly bar-shaped connector piece having on one end an input eye connected to the respective input attachment point and on the other end an output eye connected to the respective output attachment point.

13. The coupling defined in claim 1, wherein each end of each connecting element is connected to the respective attachment point with three degrees of freedom.

* * * * *